United States Patent [19]
Billberg

[11] 3,898,998
[45] Aug. 12, 1975

[54] DEVICE TO COMPENSATE PRESSURE AND LOSSES OF INERT GAS

[75] Inventor: Alfred Billberg, Stockholm, Sweden

[73] Assignee: Lisnave-Estaleiros Navais de Lisboa, S.A.R.L., Lisbon, Portugal

[22] Filed: June 11, 1974

[21] Appl. No.: 478,356

[52] U.S. Cl................. 137/113; 137/206; 220/88 B
[51] Int. Cl............................................. B65d 87/52
[58] Field of Search........... 220/88 B; 137/209, 206, 137/113

[56] References Cited
UNITED STATES PATENTS

| | | | |
|---|---|---|---|
| 2,547,823 | 4/1951 | Josephian | 137/113 |
| 2,870,936 | 1/1959 | Clayton | 220/88 B |
| 2,986,593 | 5/1961 | Detrick | 137/209 X |
| 2,989,969 | 6/1961 | Gascoin | 137/209 X |
| 3,380,462 | 4/1968 | Schiefer | 137/209 X |

*Primary Examiner*—Alan Cohan
*Attorney, Agent, or Firm*—Steinberg and Blake

[57] ABSTRACT

A system for automatically compensating for losses of inert gas in a tank which contains a combustible liquid beneath the gas. A supply pipe communicates with the tank to supply an inert gas thereto from a normal source of inert gas. A discharge pipe also communicates with the tank and carries a vacuum valve which opens automatically at a given pressure to admit air into the tank during discharge of the liquid contents thereof. An emergency source of inert gas under pressure is provided. A pressure detector communicates with the interior of the tank to provide a signal when the pressure of the inert gas in the tank drops to a value just above the given pressure at which the vacuum valve opens. A valve which is operatively connected with the emergency source of inert gas and with the pressure detector responds to the signal from the latter to assume an open position releasing inert gas from the emergency source. A pressure regulating valve is situated in the path of flow of gas from the emergency source in order to regulate the pressure thereof, this regulating valve also communicating with the tank so as to control the pressure at which inert gas from the emergency source is delivered to the tank in response to the signal from the pressure detector. This pressure regulating valve will remain open at a pressure above a pressure slightly below the pressure at which the vacuum valve automatically opens to admit air into the tank, while the pressure regulating valve automatically closes at a pressure just below the latter given pressure.

10 Claims, 3 Drawing Figures

DEVICE TO COMPENSATE PRESSURE AND LOSSES OF INERT GAS

BACKGROUND OF THE INVENTION

The present invention relates to safety systems in connection with maintaining an inert gas in a tank which holds a combustible liquid.

As is well known when combustible liquids are stored in tanks either in vessels or in stationary land installations, in order to avoid the danger of fire and explosions it is essential to maintain in the tank where the combustible liquid is located an inert gas which will prevent fire and explosions from occurring. Thus, in connection with vessels which carry or unload fuel, oil or other combustible liquids capable of having expanding combustible gases, processes were developed in order to make the atmosphere of such combustible fluids fireproof so that the interior of the tank would be maintained non-explosive. In order to achieve this result it is known, for example, to introduce into a vessel tank which contains a combustible liquid smoke or gases of combustion expelled from the engines of the vessel. Thus in order that the atmosphere in such a tank may be considered inert, as a result of introduction of gases of the above type, for example, these gases must have an oxygen content which is less than 10 percent by volume.

When a vessel of the above type having fuel-containing tanks, for example, with inert gas therein, enters a shipyard, or in other types of situations involving similar circumstances, and such vessels or installations have equipment for supplying inert gas, it is only to a partial extent that it is possible to compensate for losses of inert gas, these losses depending upon the action of various valves such as pressure vacuum valves, temperature variations, and simple leakage. Thus, it is known to provide a portable reserve or spare installation for providing additional inert gas for such purposes.

Thus, there are manufacturing firms which manufacture known types of inert gas equipment which may be portable and which utilize purified exhaust gases or gases resulting from the burning of the oil, with such portable installations operating on the same principles as those which obtain in tankers which transport such fuels or other combustible liquids on the sea.

However, with land installations there is not a requirement of the unusually large capacity required in the case of vessels of the above type. The purpose of the safety equipment is to introduce, with a certain safety margin, inert gas into the tanks in a given proportion as the tanks unload the oil which they contain. Once a ship has reached a shipyard or is at a dock, the only problem encountered is that of compensating for eventual leaks through the tank hatches, valves, and the like. It is not necessary under the latter circumstances that the safety equipment have as large a capacity as is required in the case of sea-going vessels, although it is in fact difficult to estimate precisely the required capacity because of the danger of inert gas leaks which can result from the most widely different types of varying causes which cannot be anticipated, such as during repair operations.

SUMMARY OF THE INVENTION

It is accordingly a primary object of the present invention to provide a safety aparatus which will avoid the above drawbacks.

Thus, it is an object of the present invention to provide a system which will become operative in an emergency to assure that the required supply of inert gas is maintained in a tank which holds a combustible fluid.

Furthermore, it is an object of the present invention to provide a system of the above type which will assure initiation of a supply of inert gas from an inert gas source when the pressure in the tank drops to a given value without any possible conflict between the supply of inert gas from the emergency source and the normal functioning of a normal supply of inert gas and the normal opening of a vacuum valve to admit air into the tank when the latter is unloaded.

Thus, it is one of the more specific objects of the invention to provide a safety system of the above type which will reliably prevent any loss of inert gas from the emergency source during normal unloading operations while assuring that the inert gas will be delivered from the emergency source as required to avoid the danger of fires or explosions as set forth above.

Yet another object of the present invention is to provide for a system of the above type an emergency source of inert gas which can operate in such a way that as soon as inert gas from one or more containers is substantially exhausted, the supply will automatically continue from one or more additional containers which form part of the emergency source of inert gas.

In accordance with the present invention the system for automatically compensating for losses of inert gas, in a tank which contains a combustible liquid beneath the gas, includes a supply pipe means communicating with the tank for supplying an inert gas thereto from a normal source of inert gas. Discharge pipe means also communicates with the tank and carries a vacuum valve means which automatically opens at a given pressure to admit air into the tank during discharge of the liquid contents thereof. An emergency source of inert gas under pressure is provided. A pressure detecting means communicates with the interior of the tank for providing a signal when the pressure of the inert gas therein drops to a value just above the given pressure at which the vacuum valve means opens. An emergency valve means is operatively connected with the emergency source of inert gas under pressure and with the pressure detecting means for responding to the signal from the latter in order to assume an open position releasing inert gas from the emergency source. A pressure regulating valve means is situated between the emergency valve means and the tank for controlling the pressure of the gas flowing from the emergency source into the tank in response to the signal from the pressure detecting means. This pressure regulating valve means automatically closes at a pressure slightly below the given pressure at which the vacuum valve means opens while remaining open at a pressure above the latter given pressure.

BRIEF DESCRIPTION OF THE DRAWINGS

The invention is illustrated by way of example in the accompanying drawings which form part of this application and in which.

DESCRIPTION OF PREFERRED EMBODIMENTS

Figure 1:
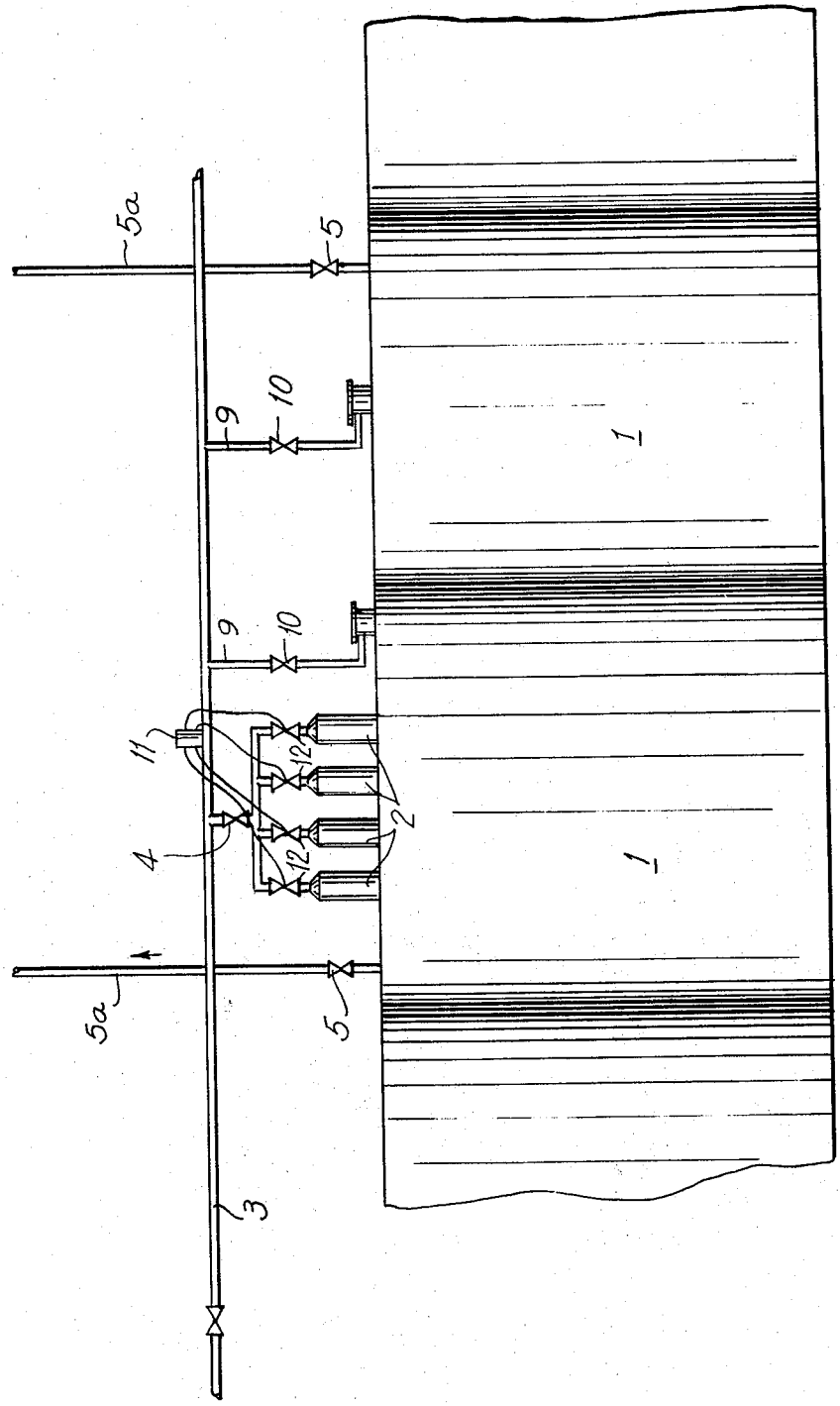
FIG. 1 is a schematic representation of one possible system according to the invention.

In accordance with the present invention replacement of smoke gases and of gases derived from a vessel engine, to be introduced into the tanks which contain fuel or oil or the like, is carried out in such a way that the latter gases are replaced by fireproof gases such as carbon dioxide, nitrogen or the like. Such gases form an emergency source of inert gas and may be stored in suitable pressurized containers such as well known pressurized bottles or cans, these containers for the emergency supply of inert gas being grouped in batteries of different capacities as required. These particular gases, such as carbon dioxide, nitrogen, or the like, are clean so that there is no danger of corrosion and there is no requirement of using cleaning equipment which is known for maintaining corrosive components. The supply of inert gas for emergency purposes from containers of the above type can be carried out easily and automatically, and this capability is extremely important in connection with safety when the vessel is in a shipyard and particularly when the vessel is in drydock.

One of the most important features of the present invention resides in providing the system with a pressure regulating valve means which controls the pressure at which the inert gas is supplied from the emergency source to the tanks. This pressure regulating valve means, one or more of which may be provided for the several tanks, respectively, is operative at an overpressure which is slightly lower than the pressure at which the pressure vacuum valves of the tanks open in connection with discharge of the contents of the tanks.

In order to compensate for the normal pressure changes which occur inside the tanks, and thus in order to compensate for the suction of outside air which might otherwise result, a pressure detecting means communicates with the tanks, for example through the supply pipe means which are provided in order to provide inert gas from a normal source. This pressure detecting means is operatively connected with one or more emergency valve means which are operatively connected with the containers, respectively, of the emergency source of inert gas, the latter containers and the emergency valve means respectively connected operatively thereto being connected in parallel and being grouped in batteries. With such a system the automatic increase in the required capacity of inert gas is assured. Thus, as the pressure of the inert gas in a tank lowers, the containers which provide the emergency source of inert gas are successively opened in an automatic manner so that when one is substantially exhausted the next will automatically open to continue the supply of emergency inert gas, with this supply automatically terminating as the pressure inside any given tank again rises to a given value. It is therefore of advantage to make at least two batteries of inert gas containers available, with one starting to operate automatically as soon as the other is incapable of continuing the supply, which is to say as soon as the other battery is at a condition of insufficient pressure.

In addition to the above-mentioned pressure detecting means which is preferably located in the pipe through which inert gas is normally supplied to the tanks, there is a device for giving an alarm in the event that the pressure drops to a level requiring a supply from the emergency gas containers. Thus, this alarm device may be combined with the pressure detecting means which controls the supply of inert gas from the emergency source.

In the example illustrated in FIG. 1, there is schematically illustrated a plurality of tanks 1 of a vessel such as a tanker which transports oil, fuel, or the like. Thus, these tanks 1 may be considered as being at least partially filled with a combustible liquid over which an inert gas is located. The inert gas is normally supplied through a supply pipe means 3 to the several tanks 1. Thus it will be seen that the distributing or supply pipe means 3 communicates through a plurality of branches 9 with the several tanks 1, respectively. The supply pipe means 3 is supplied with the inert gas from a source such as the exhaust gases derived from the Diesel engines of the vessel, with these inert gases then being conveyed from the engines to the several tanks 1. This supply will be provided as the tanks 1 become empty. For example, the exhaust gases of the engine vessels may be diverted to a suitable tank where these exhaust gases are maintained under pressure with the latter tank communicating through the distributing or supply pipe means 3 with the several fuel or oil tanks 1 in order to maintain in the latter an inert gas under normal operating conditions. The branch pipes 9 which deliver the inert gas from the supply pipe means 3 to the several tanks 1 are shown as being provided with shut-off valves 10 which can be closed when it is desired to interrupt the communication between the tanks 1 and the pipe 3. These valves 10 are normally maintained open.

An emergency source of inert gas under pressure is provided in the form of a plurality of pressurized bottles or other containers 2 which respectively hold in their interiors a supply of inert gas such as those referred to above. These bottles or containers 2 are portable and may be grouped in batteries as set forth above. The several containers 2 which form the emergency source of inert gas are connected in parallel with the supply pipe means 3 in the manner illustrated in FIG. 1. However, between the several parallel-connected containers 2 and the pipe 3 is a pressure regulating valve means 4 of the present invention. As is apparent from FIG. 1, the several tanks 1 communicate with pipes 5a which are discharge pipes in the sense that they carry, respectively, pressure vacuum valve means 5 capable of automatically opening to admit air into the tanks. Thus, in order to assure a proper operation in connection with discharge of the contents of the tanks and in order to prevent failure of any components from a pressure in the tanks which is excessively low, these pipes 5a are provided with the pressure vacuum valves 5 which are well known and which automatically open to admit air into the tanks when the pressure therein drops to a given value. Thus, each of the pressure vacuum valve means 5 may take the form of a diaphragm which responds to the pressure in the tank and which opens a given valve when the pressure drops to a given value, this valve when opening permitting air to be drawn from the outside atmosphere into the tank.

The pressure regulating valve means 4 of the present invention operates at an overpressure which is adjusted so as to be slightly lower than the pressure at which the valve means 5 will open. Thus, the pressure regulating valve means 4 is adjusted so as to remain open at pressure above the given pressure at which the valve means 5 opens as well as down to a pressure slightly below this given pressure, whereas if the pressure drops substantially below the given pressure at which the valve means 5 opens the pressure-regulating valve means 4 will automatically close.

A pressure detecting means 11 communicates with one or more of the tanks 1 so as to detect the pressure therein and so as to provide a signal when the pressure in each tank 1 drops to a value just above the given pressure at which the pressure vacuum valve means 5 automatically opens. In the illustrated example the pressure detecting means 11 is mounted on the supply pipe means 3 so as to communicate through the latter and the branches 9 thereof with the several tanks 1, and when the pressure in the tanks 1 drops to a value just above that at which the valves 5 would automatically open to admit outside air, the detecting means 11 provides a signal. In the illustrated example the pressure-detecting means 11 is electrical and transmits the signal to the solenoid valves 12 which are schematically indicated in FIG. 1 for controlling the opening of the several containers 2 which form the emergency source of inert gas. Thus, through the electrical connections between the solenoid valves 12 and the pressure detecting means 11, there will be an automatic opening of one or more of the containers 2, as required, in order to supply inert gas from the emergency source. Thus, the initial signal from the pressure detecting means 11 may, for example, open the first of the containers 2 by opening the solenoid valve 12 connected thereto, and as the first container empties the pressure therein will drop. When this latter pressure drops to a given value the second container will automatically open by way of its solenoid valve 12, so that in this way the several containers or several groups of containers can be actuated to operate automatically in succession.

Figure 2:
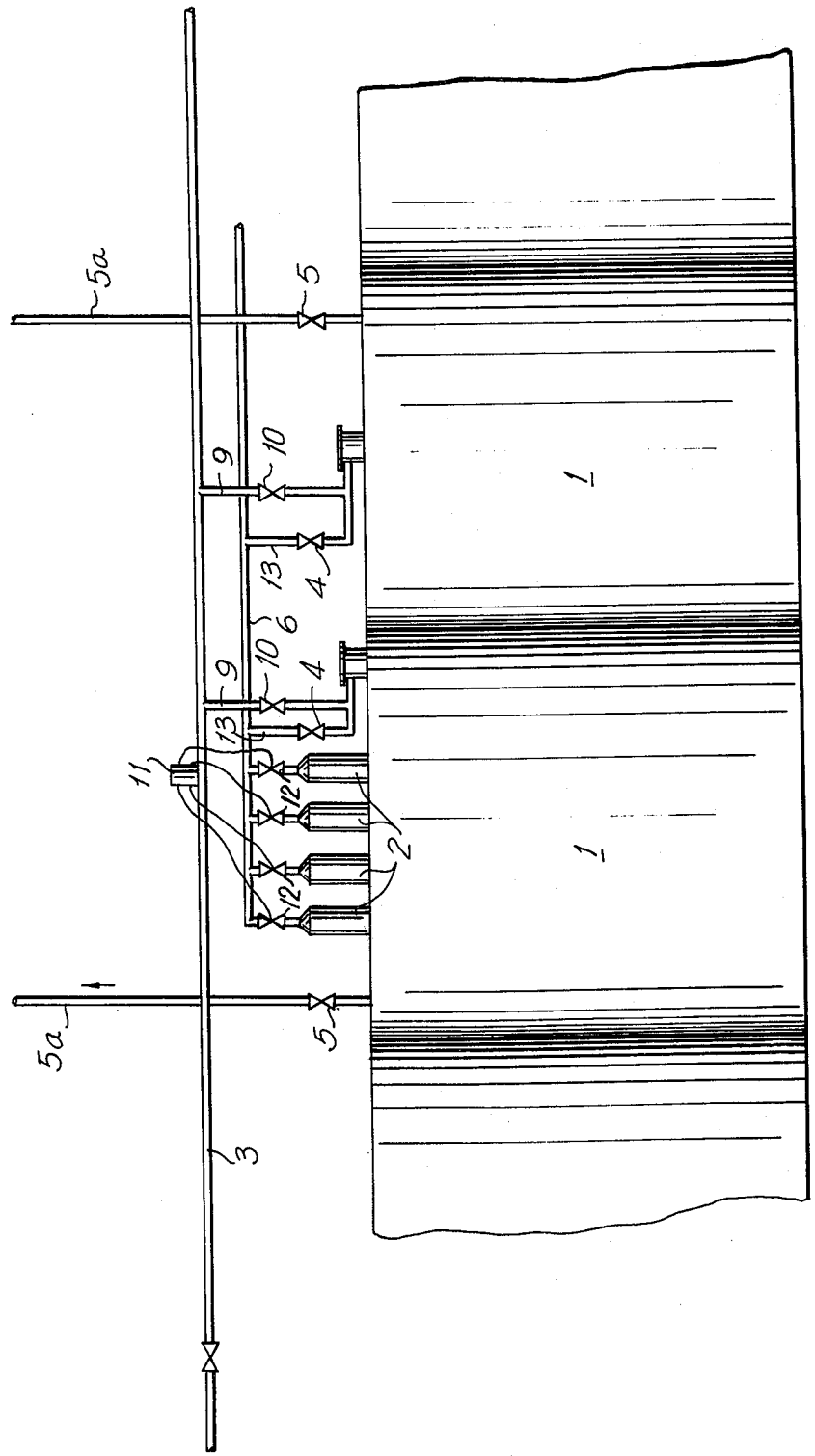
FIG. 2 is a schematic illustration of a variation of the sytem of FIG. 1.

As is shown in FIG. 2, instead of connecting the pressure regulating valve means 4 to the supply pipe means 3 upstream of the pressure detecting means 11, it is possible also to provide from the solenoid valves 12 a second distributing pipe 6 having branches 13 communicating with the several tanks, respectively, through the several illustrated pressure-regulating valve means 4, so that with such a construction these pressure regulating valve means 4 are respectively provided for the separate tanks and are connected to the supply pipe means 3, 9, downstream of the pressure detecting means 11.

It is to be noted that while the pressure detecting means 11 is shown operatively connected with the supply pipe means 3 in order to communicate through the latter with the tanks 1, it is also possible to provide one or more pressure detecting means 11 which communicate directly with the tanks 1 for sensing the pressure therein.

Thus, the schematically illustrated group of containers 2 which form the emergency source of inert gas can be provided in several groups depending upon the particular vessel requirements and also they can be provided in various sizes. It is preferred to utilize for the emergency inert gas in the containers 2 carbon dioxide or nitrogen as pointed out above. These containers which form the emergency source of inert gas are utilized in the event that the engine vessels are not operating so that the normal source of inert gas is interrupted. Under these latter circumstances when the inert gas pressure lowers undesirablly in one or in all of the tanks there will be an automatic supply of inert gas from the emergency source. It is also possible to provide an arrangement where the inert gas in the pressure containers 2 is in the form of gases derived from the vessel engines, so that in this way it is possible to recharge the containers 2 when they become empty.

Figure 3:
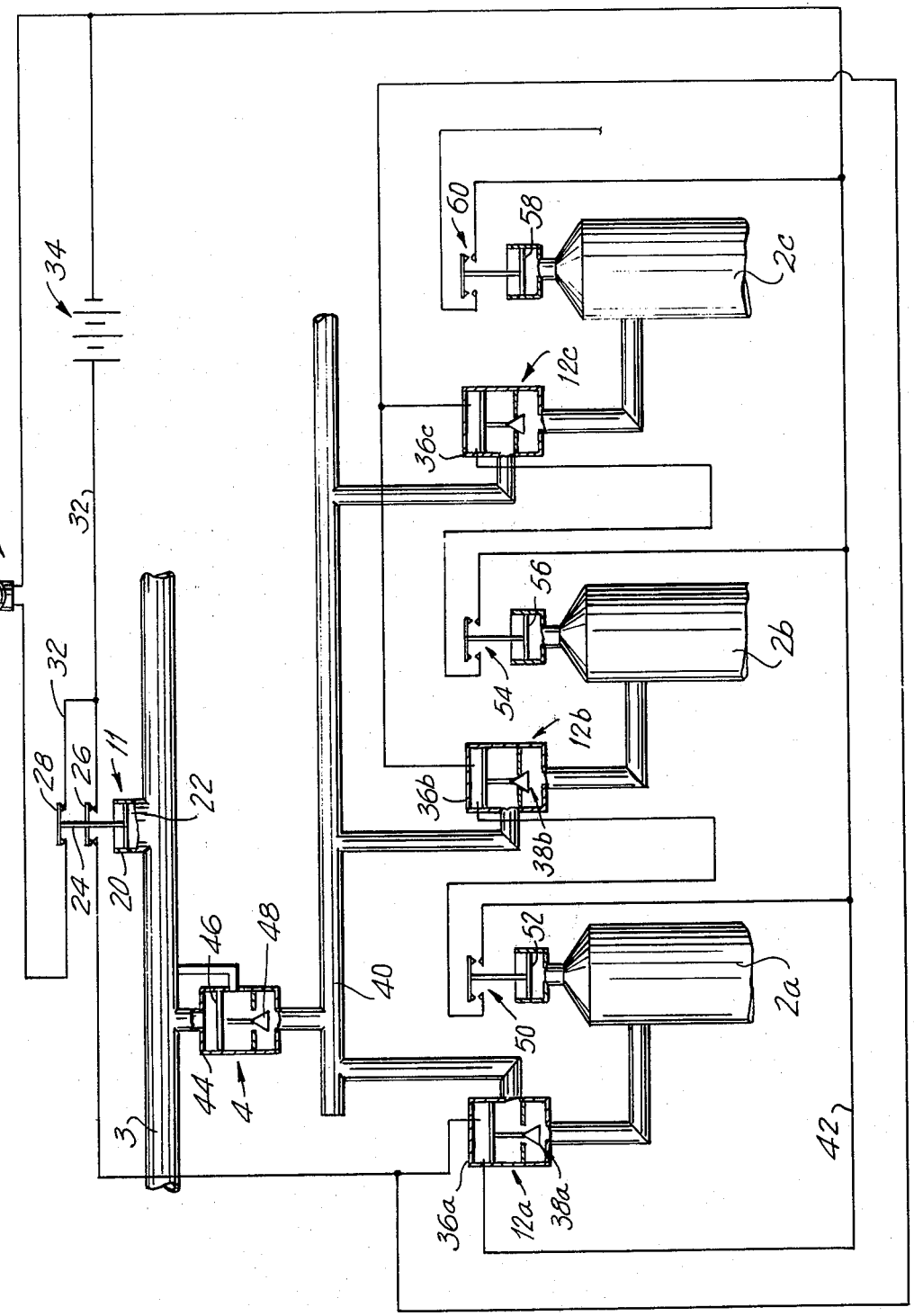
FIG. 3 is a fragmentary schematic illustration showing details of the systems of FIGS. 1 and 2.

Part of the structure shown schematically in FIG. 1 is fragmentarily shown also schematically but in somewhat greater detail in FIG. 3 which also illustrates possible electrical connections as well as an alarm means which is combined with the pressure detecting means 11. Thus it will be seen that FIG. 3 fragmentarily illustrates that part of the supply pipe means 3 to which the pressure detecting means 11 is connected. This pressure detecting means 11 takes the form of a housing 20 communicating with the interior of the pipe 3 and carrying in its interior a diaphragm 22 which responds to pressure variations. This diaphragm 22 actuates a switch-operating rod 24 which carries a pair of contact units 26 and 28. The detecting means 11 is shown in FIG. 3, for the sake of clarity, in a position it takes when responding to the dropping of pressure in order to give a signal, so that the switch members 26 and 28 are shown in FIG. 3 in their closed positions where they bridge across the gaps between conductors 30 and 32. These conductors 30 and 32 are supplied with electricity from any suitable source such as the illustrated battery 34. Normally the switch elements 26 and 28 will be raised above the elevation shown in FIG. 3 so that the circuit will be open. It is only when the pressure drops to a value just above that at which the valves 5 will open that the parts take the position shown in FIG. 3 where the switch elements 26 and 28 close the illustrated circuits.

FIG. 3 shows the first three of the containers 2 designated 2a, 2b, and 2c. It is to be understood that additional containers are included. The container 2a is shown as having its interior communicating with the solenoid valve 12a which includes the electromagnet 36a which when energized opens the valve 38a. In the example of FIG. 3 where the detecting means 11 has detected the dropping of the pressure to provide the signal, the electromagnet 36a is energized so that the valve 38a is shown in its open position, and thus the gas can flow through the valve 38a into a header 40 which communicates with the pressure regulating valve means 4. It will be noted that the electromagnet 36a is electrically connected through a conductor 42 with one pole of the battery 34 and through the switch 26 and the conductor 32 with the other pole of the battery 34, so that the solenoid valve 12a is energized to assume its open position admitting gas under pressure from the container 2a through the header 40 to the pressure regulating valve means 4.

The pressure regulating valve means 4 is also shown as taking the form of a diaphragm valve which in the illustrated example has a housing 44 in the interior of which is located a diaphragm 46 for responding to the pressure in the tank, and more particularly in the pipe 3 which communicates with the tank as described above. It will be seen that the diaphragm 46 controls a valve 48 which is shown in its open position in FIG. 3. As was indicated above, an unillustrated conventional adjusting structure is provided for the pressure regulating valve means 4 so as to cause the diaphragm 46 to move the valve 48 to its closed position when the pressure in the tank drops to a value slightly below that at which the vacuum valve 5 opens.

Thus, under the conditions shown in FIG. 3, the detecting means 11 has responded to the drop in pressure in order to open the solenoid valve 12a connected to the first of the containers 2a, and the gas flows from the latter through the pressure regulating valve means 4 into the pipe 3 in order to replace losses of inert gas in the tank 1.

The second container 2b is constructed in the same way as the container 2a and is operatively connected with a solenoid valve 12b identical with the valve 12a. The electromagnet 36b of the solenoid valve 12b is connected with one pole of the battery 34 in the same way as the solenoid 36a. However between the solenoid 36b and the other pole of the battery is a switch 50 controlled by a diaphragm 52 which responds to the pressure in the tank 2a. It is only when the pressure in the latter tank drops to a given value that the switch 50 will close so as to energize the electromagnet 36b and thus open the valve 38b. Thus it will be seen that the valve 38b is shown in FIG. 3 in its closed position. As soon as the pressure in the tank 2a drops to act on the diaphragm 52 in order to close the switch 50, the electromagnet 36b will become energized in order to continue the supply of inert gas from the second container 2b. It will be noted that through the valve 38b, when the latter is open, the inert gas will flow from the container 2b to the header 40 and from the latter through the pressure regulating valve 4 to the supply pipe 3.

In the same way, the next container 2c has the flow of gas therefrom regulated by a solenoid valve 12c which is constructred in the same way as the other solenoid valves 12a and 12b. However, the electromagnet 36c of the solenoid valve 12c will only become energized when the switch 54 closes, this switch 54 being controlled by a diaphragm 56 which responds to the pressure in the tank 2b in the same way that the diaphragm 52 responds to the pressure in the tank 2a. Thus the solenoid valve 12c will not open until the pressure in the tank 2b drops to a given value, and in this way the supply will continue from the third container 2c when the supply from the second container 2b is substantially exhausted. In the same way, the tank 2c has its interior in communication with a diaphragm 58 which controls a switch 60 for preventing the solenoid valve of the next tank from becoming energized until the tank 2c is substantially empty. Thus with the above structure it is possible to successively open the several containers for the inert gas as required in order to assure a supply of inert gas for emergency purposes as referred to above.

In addition, it will be noted that the rod 24 through the switch 28 controls the alarm means 62. This alarm means is shown schematically as taking the form of a lamp 64, although an audible alarm may also be given in addition to a visual alarm. In the illustrated example when the lamp 64 which forms the alarm means 62 is illuminated it will be known that the inert gas is being derived from the emergency source. Thus, as is apparent from FIG. 3 whenever the switch 26 is displaced to its closed position to initiate the supply of inert gas from the emergency source the switch 28 will also close to actuate the alarm means 62 and thus give the operator an indication that inert gas is being derived from the emergency source, so that suitable steps can be taken to carry out procedures such as checking to determine where the inert gas is leaking from, for example.

It is thus apparent that with the above-described structure of the present invention it is possible to assure a supply of inert gas under emergency conditions and thus avoid the possibility of fires or explosions. Because the pressure regulating valve means 4 remains open at all pressures higher than a value slightly lower than that at which the pressure vacuum valve 5 opens, the supply of inert gas from the emergency source to the tank is assured. However, during an operation such as emptying of a tank when there is a substantial rapid increase in the space above the liquid, there will be an extremely rapid sudden drop in the pressure with the result that the increased volume of space above the liquid will be supplied either with inert gas from the pipe 3 or with outside air through the valve 5. In either event, under these conditions of lowering of the level of the liquid and substantial increase in the volume above the liquid with a substantial drop in pressure below that at which the vacuum valves 5 open, the valve 4 will automatically close to prevent any gas from being taken from the emergency source, even if a signal is given by the pressure detecting means 11. Thus, under these conditions where the tank is being emptied, the structure of the invention will prevent discharge of gas from the emergency source, thus assuring that the latter is available for emergency purposes as described above.

What is claimed is:

1. In a system for automatically compensating for losses of inert gas in a tank which contains a combustible liquid beneath the gas, supply pipe means communicating with said tank for supplying an inert gas thereto from a normal source of inert gas, discharge pipe means also communicating with said tank and carrying a vacuum valve means which automatically opens at a given pressure to admit air into said tank during discharge of the liquid contents thereof, an emergency source of inert gas under pressure, pressure detecting means communicating with the interior of said tank for providing a signal when the pressure of the inert gas therein drops to a value just above said given pressure, emergency valve means operatively connnected with said emergency source of inert gas under pressure and with said pressure detecting means for responding to said signal to assume an open position releasing inert gas from said emergency source, and pressure regulating valve means situated between said emergency valve means and said tank for controlling the pressure of the gas flowing from said emergency source into said tank in response to said signal from said pressure detecting means, said pressure regulating valve means automatically closing at a pressure slightly below said given pressure while remaining open at a pressure above said given pressure.

2. The combination of claim 1 and wherein said pressure detecting means is operatively connected with said supply pipe means for detecting pressure in said tank through said supply pipe means.

3. The combination of claim 1 and wherein said pressure regulating valve means is situated between and connected with said emergency valve means and said supply pipe means for communicating through the latter with said tank.

4. The combination of claim 3 and wherein said pressure detecting means is also operatively connected with said supply pipe means for communicating therethrough with said tank.

5. The combination of claim 4 and wherein said pressure detecting means is connected to said supply pipe means downstream of said pressure regulating valve means.

6. The combination of claim 4 and wherein said pressure detecting means is operatively connected with said supply pipe means upstream of said pressure detecting valve means.

7. The combination of claim 1 and wherein said emergency source of inert gas includes a plurality of containers for inert gas, a plurality of said emergency valve means being operatively connected with said containers, and means interconnected with said plurality emregency valve means between the latter and said pressure detecting means for opening said plurality of emergency valve means which are respectively connected to said containers in succession in response to a signal from said pressure detecting means so that said containers are utilized in succession one after the other in an automatic manner to supply the inert gas.

8. The combination of claim 7 and wherein said containers are connected in parallel with said pressure regulating valve means.

9. The combination of claim 8 and wherein a pluralitiy of tanks respectively communicate with said supply pipe means and a plurality of said pressure regulating valve means are operatively connected with said plurality of tanks, said emergency source of inert gas communicating through said plurality of pressure regulating valve means respectively with said plurality of tanks.

10. The combination of claim 1 and wherein an alarm means is operatively connected with said pressure detecting means for giving an alarm when said pressure detecting means provides said signal.

* * * * *